US011182193B2

(12) United States Patent
Skourtis et al.

(10) Patent No.: US 11,182,193 B2
(45) Date of Patent: Nov. 23, 2021

(54) OPTIMIZING IMAGE RECONSTRUCTION FOR CONTAINER REGISTRIES

(71) Applicant: International Business Machines Corporation, Armonk, NY (US)

(72) Inventors: Dimitrios Skourtis, Santa Cruz, CA (US); Vasily Tarasov, Port Jefferson Station, NY (US); Lukas Rupprecht, San Jose, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/460,843

(22) Filed: Jul. 2, 2019

(65) Prior Publication Data
US 2021/0004251 A1 Jan. 7, 2021

(51) Int. Cl.
*G06F 9/455* (2018.01)
*G06F 9/445* (2018.01)

(52) U.S. Cl.
CPC ...... *G06F 9/45558* (2013.01); *G06F 9/44505* (2013.01); *G06F 9/44578* (2013.01); *G06F 2009/45562* (2013.01)

(58) Field of Classification Search
CPC ............. G06F 9/45558; G06F 9/44578; G06F 9/44505; G06F 2009/45562; G06F 2009/45583; G06F 2009/45579
See application file for complete search history.

(56) References Cited

U.S. PATENT DOCUMENTS

| 7,010,538 B1 * | 3/2006 | Black | H04L 67/02 707/636 |
| 8,195,734 B1 * | 6/2012 | Long | G06F 16/285 708/520 |

(Continued)

FOREIGN PATENT DOCUMENTS

| CN | 106227579 A | 12/2016 |
| CN | 107544824 A | 1/2018 |

(Continued)

OTHER PUBLICATIONS

Nadgowda et al., "RECap: Run-Escape Capsule for On-demand Managed Service Delivery in the Cloud," Unsenix, HotCloud '18, 2018, pp. 1-7, retrieved from https://www.usenix.org/system/files/conference/hotcloud18/hotcloud18-paper-nadgowda.pdf.

(Continued)

*Primary Examiner* — Emerson C Puente
*Assistant Examiner* — Zhi Chen
(74) *Attorney, Agent, or Firm* — Zilka-Kotab, P.C.

(57) ABSTRACT

A computer-implemented method includes receiving characteristic information of a container registry. The container registry includes a plurality of container images. The method includes selecting at least two container images in the container registry and selecting parameters for optimization based on the characteristic information. The method also includes generating a cost function based on the parameters for optimization and optimizing the at least two container images in the container registry based on the cost function. A computer-implemented method includes receiving a composition of each of at least two layers in a container image. The composition of each of the at least two layers includes at least one file. The method includes mapping overlap between the composition of the at least two layers and estimating a redundancy in the container image based on the (Continued)

overlap. The method also includes calculating new layers which reduce the redundancy in the container image.

19 Claims, 7 Drawing Sheets

(56) References Cited

U.S. PATENT DOCUMENTS

| | | | | |
|---|---|---|---|---|
| 9,081,840 | B2* | 7/2015 | Nair | G06F 16/1844 |
| 9,928,062 | B2 | 3/2018 | Azagury et al. | |
| 10,169,209 | B2 | 1/2019 | McPherson et al. | |
| 10,671,360 | B1* | 6/2020 | Todd | G06F 11/3466 |
| 10,778,664 | B1* | 9/2020 | Sullivan | G06F 16/248 |
| 2002/0087567 | A1* | 7/2002 | Spiegler | G06F 16/284 |
| 2003/0030733 | A1* | 2/2003 | Seaman | G06F 16/40 348/239 |
| 2003/0154216 | A1* | 8/2003 | Arnold | G06F 16/211 |
| 2003/0220941 | A1* | 11/2003 | Arnold | G06F 16/2453 |
| 2009/0157378 | A1* | 6/2009 | Boldyrev | G06F 11/008 703/22 |
| 2009/0210360 | A1* | 8/2009 | Sankar | G06F 9/44505 706/10 |
| 2010/0325126 | A1* | 12/2010 | Rajaram | G06Q 30/02 707/759 |
| 2012/0084445 | A1* | 4/2012 | Brock | G06F 9/5077 709/226 |
| 2012/0136902 | A1* | 5/2012 | Oyarzabal | G06F 16/40 707/802 |
| 2013/0111033 | A1* | 5/2013 | Mao | G06F 9/5072 709/226 |
| 2013/0166871 | A1* | 6/2013 | Chen | G06F 12/0223 711/170 |
| 2013/0326503 | A1* | 12/2013 | De | G06F 9/45558 718/1 |
| 2014/0007239 | A1* | 1/2014 | Sharpe | G06F 16/137 726/24 |
| 2014/0289245 | A1* | 9/2014 | Deshpande | H04L 41/14 707/737 |
| 2015/0248281 | A1* | 9/2015 | Zamir | G06F 8/63 717/171 |
| 2016/0065494 | A1* | 3/2016 | Aiello | H04L 47/783 709/226 |
| 2016/0350146 | A1* | 12/2016 | Udupi | G06F 9/5027 |
| 2017/0026263 | A1* | 1/2017 | Gell | G06F 16/1844 |
| 2017/0264684 | A1 | 9/2017 | Spillane et al. | |
| 2017/0293501 | A1* | 10/2017 | Barapatre | G06F 9/45558 |
| 2017/0374151 | A1 | 12/2017 | Moorthi et al. | |
| 2018/0095972 | A1* | 4/2018 | Zlaty | G06F 16/287 |
| 2018/0236986 | A1* | 8/2018 | Kim | B60Q 9/008 |
| 2018/0349150 | A1 | 12/2018 | Wong et al. | |
| 2019/0102212 | A1* | 4/2019 | Bhandari | G06T 1/20 |
| 2019/0310872 | A1* | 10/2019 | Griffin | G06F 9/544 |
| 2019/0391900 | A1* | 12/2019 | Pannem | G06F 3/0653 |
| 2020/0278877 | A1* | 9/2020 | Scrivano | G06F 9/45558 |
| 2020/0409921 | A1* | 12/2020 | Starks | G06F 9/54 |

FOREIGN PATENT DOCUMENTS

| | | |
|---|---|---|
| CN | 108509253 A | 9/2018 |
| CN | 108984268 A | 12/2018 |

OTHER PUBLICATIONS

Docker, "Containers," Docker Inc., 2019, 8 pages, retrieved from https://hub.docker.com/search/?type=image.
Brewer, E., "Kubernetes and the Path to Cloud Native," 7th USENIX Workshop on Hot Topics in Cloud Computing, Jul. 2015, 2 pages, (abstract only) retrieved from https://www.usenix.org/conference/hotcloud15/workshop-program/presentation/kubernetes-and-path-cloud-native.
Tarasov et al., "Evaluating Docker Storage Performance: from Workloads to Graph Drivers," pre-print, Springer, Cluster Computing, 2019, pp. 1-13, from https://link.springer.com/article/10.1007/s10586-018-02893-y.
GitHub,"docker-slim/docker-slim," GitHub, 2019, 16 pages, retrieved from https://github.com/docker-slim/docker-slim.
Amazon, "Amazon Elastic Container Registry," Amazon, 2019, 7 pages, retrieved from https://aws.amazon.com/ecr/.
Amazon,"Amazon S3 Pricing," Amazon, 2019, 15 pages, retrieved from https://aws.amazon.com/s3/pricing/.
Microsoft Azure, "Container Registry," Microsoft, 2019, 7 pages, retrieved from http://azure.microsoft.com/en-us/services/container-registry/.
Docker, "Enterprise Container Platform for High-Velocity Innovation," Docker Inc., 2019, 4 pages, retrieved from https://www.docker.com/.
Docker, "Docker Hub: Build and Ship any Application Anywhere," Docker Inc., 2019, 5 pages, retrieved from https://hub.docker.com/.
Google, "Container Registry," Google, accessed on Jun. 27, 2019, 7 pages, retrieved from https://cloud.google.com/container-registry/.
IBM, "IBM Cloud Container Registry," IBM, accessed on Jun. 27, 2019, 8 pages, retrieved from https://www.ibm.com/cloud/container-registry.
JFROG, "JFROG Artifactory: Enterprise Universal Repository Manager," JFrog Ltd., 2019, 7 pages, retrieved from https://jfrog.com/artifactory/.
Anwar et al., "Improving Docker Registry Design based on Production Workload Analysis," Proceedings of the 16th USENIX Conference on File and Storage Technologies, Feb. 12-15, 2018, pp. 265-278.
Bhimani et al., "Understanding Performance of I/O Intensive Containerized Applications for NVMe SSDs," IEEE, 2016, 8 pages.
Bliek et al., "Solving Mixed-Integer Quadratic Programming problems with IBM-CPLEX: a progress report," Proceedings of the Twenty-Sixth RAMP Symposium, Oct. 16-17, 2014, pp. 171-180.
El-Shimi et al., "Primary Data Deduplication—Large Scale Study and System Design," USENIX Annual Technical Conference, Jun. 13-15, 2012, pp. 1-12, retrieved from https://www.usenix.org/conference/atc12/technical-sessions/presentation/el-shimi.
Foster-Johnson et al., "RPM Guide," Fedora, May 2003, 404 pages, retrieved from https://foster-johnson.com/red-hat.html.
Gleixner et al., "The SCIP Optimization Suite 6.0," Zuse Institute Berlin, Jul. 2, 2018, pp. 1-40, retrieved from https://opus4.kobv.de/opus4-zib/files/6936/scipopt-60.pdf.
Hardi et al., "Making containers lazy with Docker and CernVM-FS," IOP Conference Series: Journal of Physics, vol. 1085, No. 032019, 2018, pp. 1-6.
Harter et al., "Slacker: Fast Distribution with Lazy Docker Containers," Proceedings of the 14th USENIX Conference on File and Storage Technologies (FAST'16), Feb. 22-25, 2016, pp. 181-195.
Lamourine, M., "Storage Options for Software Containers," ;login:, vol. 40, No. 1, Feb. 2015, pp. 10-14.
Mancinelli et al., "Managing the Complexity of Large Free and Open Source Package-Based Software Distributions," ASE '06: Proceedings of the 21st IEEE/ACM International Conference on Automated Software Engineering, 2006, pp. 1-10.
Menage, P., "Adding Generic Process Containers to the Linux Kernel," Linux Symposium, vol. 2, Jun. 27-30, 2007, pp. 45-58.
Meyer et al., "A Study of Practical Deduplication," ACM Transactions on Storage (TOS), 2012, 13 pages, retrieved from https://scholar.google.com/scholarq=A+Study+of+Practical+Deduplication&hl=en&as_sdt=0&as_vis=1&oi=scholart.
Nathan et al., "CoMICon: A Co-operative Management System for Docker Container Images," IEEE International Conference on Cloud Engineering, 2017, pp. 116-126.
Paulo et al., "A Survey and Classification of Storage Deduplication Systems," ACM Computing Surveys, vol. 47, No. 1, Article 11, May 2014, pp. 11:1-11:30.
Soltesz et al., "Container-based Operating System Virtualization: A Scalable, High-performance Alternative to Hypervisors," ACM, Eurosys '07, Mar. 21-23, 2007, pp. 275-287.

(56) References Cited

OTHER PUBLICATIONS

Thalheim et al., "Cntr: Lightweight OS Containers," Proceedings of the USENIX Annual Technical Conference (USENIX ATC'18), Jul. 11-13, 2018, pp. 199-212.

Wu et al., "TotalCOW: Unleash the Power of Copy-On-Write for Thin-provisioned Containers," ACM, APSys '15, Jul. 27-28, 2015, 7 pages.

Xu et al., "Performance Analysis of Containerized Applications on Local and Remote Storage," 33rd International Conference on Massive Storage Systems and Technology (MSST 2017), May 2017, 12 pages.

Zheng et al., "Wharf: Sharing Docker Images in a Distributed File System," ACM Symposium on Cloud Computing (SoCC '18), Oct. 11-13, 2018, 12 pages.

Brown, N., "Overlay Filesystem," Kernel.org, accessed on Jul. 2, 2019, 8 pages, retrieved from https://www.kernel.org/doc/Documentation/filesystems/overlayfs.txt.

Quay, "Quay [builds, analyzes, distributes] your container images," Red Hat Inc., accessed on Jul. 2, 2019, 5 pages, retrieved from https://quay.io/.

CSRC, "Cloud Computing," Computer Security Resource Center, Oct. 2017, 3 pages, retrieved from https://csrc.nist.gov/projects/cloud-computing.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Du et al., "Cider: a Rapid Docker Container Deployment System Through Sharing Network Storage," IEEE 19th International Conference on High Performance Computing and Communications, 2017, pp. 332-339.

Kangjin et al., "FID: A Faster Image Distribution System for Docker Platform," IEEE 2nd International Workshops on Foundations and Applications of Self* Systems (FAS*W), 2017, pp. 191-198.

Tarasov et al., "In Search of the Ideal Storage Configuration for Docker Containers," IEEE 2nd International Workshops on Foundations and Applications of Self* Systems (FAS*W), 2017, pp. 199-206.

SourceForge, "AUFS," SourceForge, accessed on Jul. 2, 2019, 11 pages, retrieved from http://aufs.sourceforge.net/.

* cited by examiner

OPTIMIZING IMAGE RECONSTRUCTION FOR CONTAINER REGISTRIES

BACKGROUND

The present invention relates to container images, and more particularly, this invention relates to optimizing image reconstruction for container registries in cloud storage systems and networks.

BRIEF SUMMARY

A computer-implemented method, according one embodiment, includes receiving characteristic information of a container registry. The container registry includes a plurality of container images. The method includes selecting at least two container images in the container registry and selecting parameters for optimization based on the characteristic information. The method also includes generating a cost function based on the parameters for optimization and optimizing the at least two container images in the container registry based on the cost function.

A computer-implemented method, according to one embodiment, includes receiving a composition of each of at least two layers in a container image. The composition of each of the at least two layers includes at least one file. The method includes mapping overlap between the composition of the at least two layers and estimating a redundancy in the container image based on the overlap. The method also includes calculating new layers which reduce the redundancy in the container image.

A computer program product for reducing redundancy, according to one embodiment, includes a computer readable storage medium having program instructions embodied therewith. The program instructions are executable by a computer to cause the computer to receive, by the computer, characteristic information of a container registry. The container registry includes a plurality of container images. The program instructions cause the computer to select, by the computer, at least two container images in the container registry and select, by the computer, parameters for optimization based on the characteristic information. The program instructions also cause the computer to generate, by the computer, a cost function based on the parameters for optimization and optimize, by the computer, the at least two container images in the container registry based on the cost function.

Other aspects and embodiments of the present invention will become apparent from the following detailed description, which, when taken in conjunction with the drawings, illustrate by way of example the principles of the invention.

DETAILED DESCRIPTION

Figure 1:
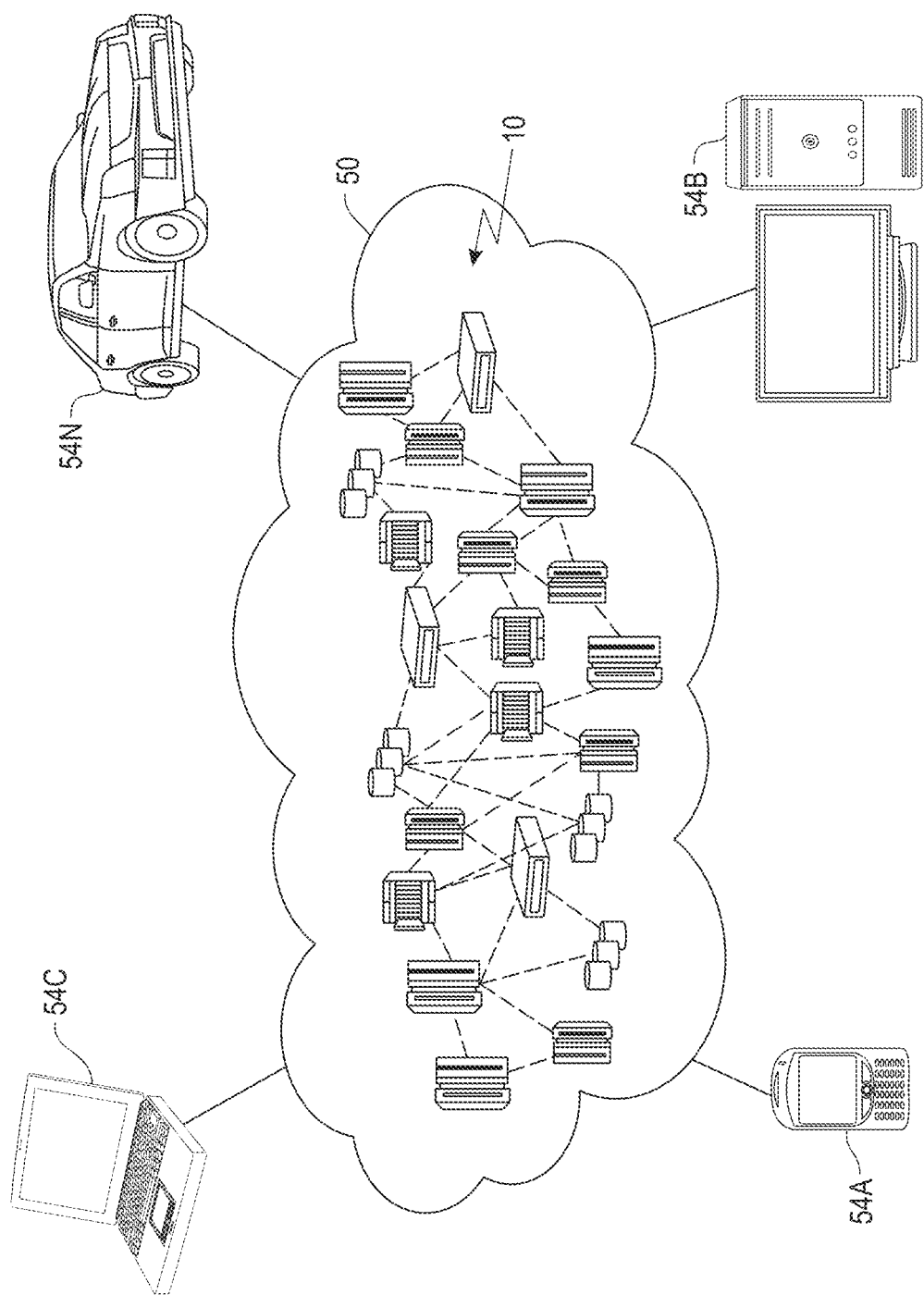
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of optimizing image reconstruction for container registries in cloud storage systems and networks.

In one general embodiment, a computer-implemented method includes receiving characteristic information of a container registry. The container registry includes a plurality of container images. The method includes selecting at least two container images in the container registry and selecting parameters for optimization based on the characteristic information. The method also includes generating a cost function based on the parameters for optimization and optimizing the at least two container images in the container registry based on the cost function.

In another general embodiment, a computer-implemented method includes receiving a composition of each of at least two layers in a container image. The composition of each of the at least two layers includes at least one file. The method includes mapping overlap between the composition of the at least two layers and estimating a redundancy in the container image based on the overlap. The method also includes calculating new layers which reduce the redundancy in the container image.

In another general embodiment, a computer program product for reducing redundancy includes a computer readable storage medium having program instructions embodied therewith. The program instructions are executable by a computer to cause the computer to receive, by the computer, characteristic information of a container registry. The container registry includes a plurality of container images. The program instructions cause the computer to select, by the computer, at least two container images in the container registry and select, by the computer, parameters for optimization based on the characteristic information. The program instructions also cause the computer to generate, by the computer, a cost function based on the parameters for optimization and optimize, by the computer, the at least two container images in the container registry based on the cost function.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
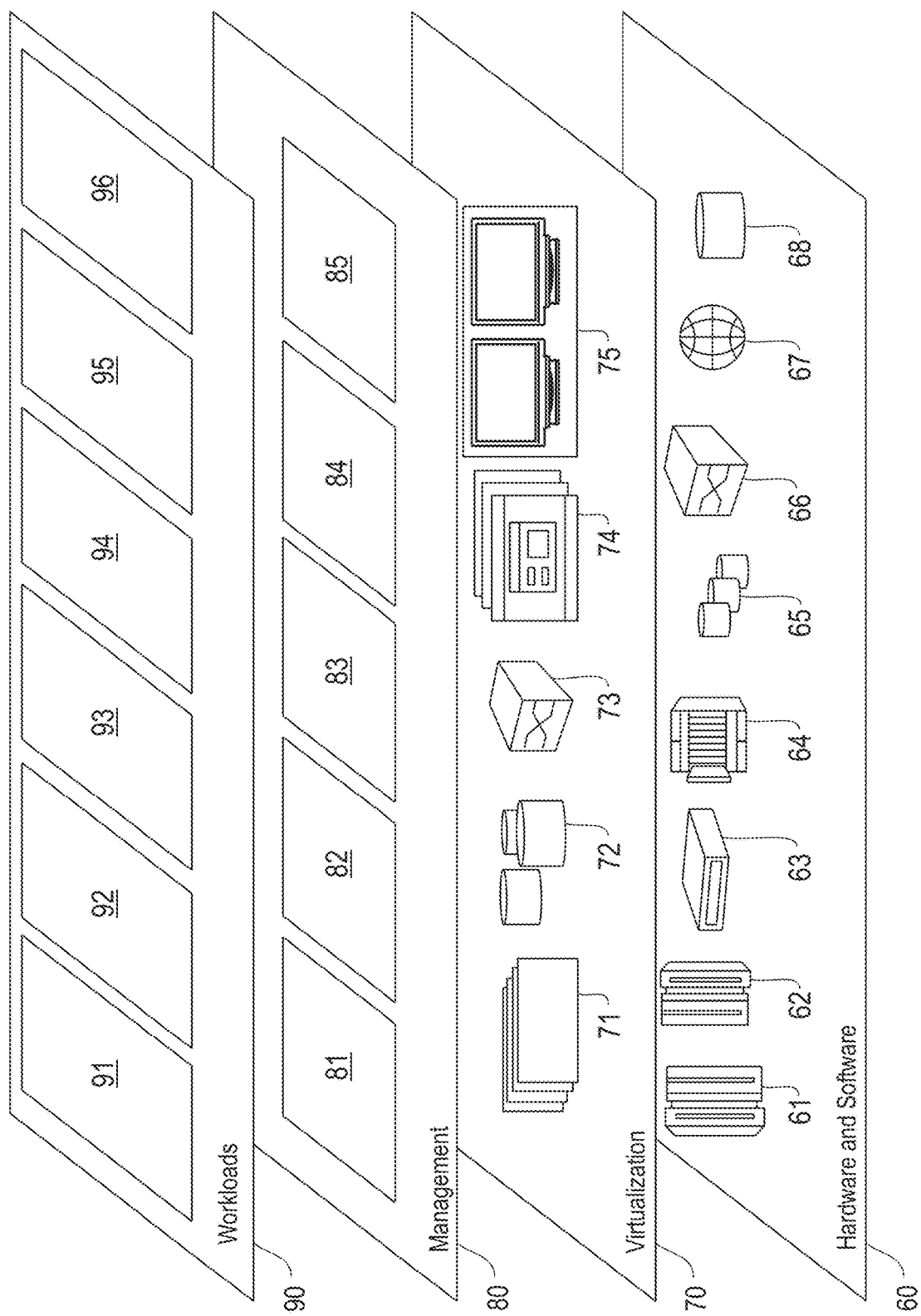
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing image reconstruction for container registries 96.

Containers are lightweight, standalone, executable software packages which may be portable irrespective of the operating system (OS) and/or kernel environments. Containers may be an abstraction of the application layer which packages code and/or dependencies together. Multiple containers may be running on the same machine where the containers share an OS. Each container may run an isolated process within the user space.

Container images are static files which include executable code for running isolated processes on information technology (IT) infrastructure. Container images may be stored in online stores (e.g., container registries). Each container image is a combination of manifest (e.g., metadata including information about the container image layers, size, digest, operating system (OS), architecture, runtime requirements, etc.) and various layers (e.g., compressed tar files). Container images contain applications and the required runtime dependencies. Container images may be easily versioned, stored, and shared via centralized container registry services. Container registries store and serve millions of container images allowing developers to "push" and "pull" images as well as make changes to those images.

Container images are structured in layers where each layer comprises part of the image contents (e.g., a set of files). No files in container images are removable from existing images. New files may only be added (e.g., at the expense of increasing the image size and/or the number of layers). The layers may be combined to form the container root file system. Layers are read-only. Identical layers may be shared across container images and containers and stored only once as layers. In practice, the ability to share layers across container images is limited because layers are rarely fully identical.

File-level reusability in layers is limited. For example, Layer 1 contains File X, File 1, File 2, . . . up to File 99. Layer 2 contains File 1, File 2, . . . up to File 99, and File Y. Although 99% of files are the same across Layer 1 and Layer 2, each complete set of files must be stored because deduplication is at the layer level conventionally. The space requirement doubles (e.g., end to end) assuming the files are of equal size. The network traffic during push/pull operations may also double (e.g., end to end). The number of duplicate files and total redundancy capacity are significant in container registries because of relatively small differences of files in each layer.

In one conventional approach, a content-addressable storage scheme may be used to identify duplicate layers in between the same scheme and store only one copy of each layer. The content-addressable storage scheme may reduce storage utilization on the registry and end hosts. The content-addressable storage scheme may be applied to locally stored images. In practice, layers are rarely identical and the content-addressable storage scheme results in limited storage savings. For example, of the 10,000 most popular DockerHub images, consisting of 104,667 layers, only 36% of the layers are identical and the storage reduction is only improved by a factor of 1.48 using conventional content-addressable storage schemes.

Another conventional approach to reduce storage requirements of a registry is to use deduplication-capable storage. Such storage does not reduce the network traffic nor the client storage footprint.

Similarly, some possible approaches include placing each file in its own layer. Every layer is content-addressable, and no duplicate files are stored. The lack of duplicate files reduces redundancy. However, unification technologies on the client side experience performance overhead because putting each file in its own layer significantly increases the number of layers to be merged. Alternatively placing all files of each image in a single layer significantly increases storage redundancy and leads to downloading files that are not needed. One having ordinary skill in the art would understand that placing all files in a single layer significantly increases network/client storage redundancy beyond practical applications.

Any of the above conventional approaches do not address all network, storage, and number of layers considerations to efficiently reduce the amount of network traffic between the registry and clients. Additionally, clients often continue to store the images in original, non-deduplicated forms which requires excessive storage space. Conventional deduplication processes add significant memory, CPU, and I/O overhead. For example, on a layer push, the known deduplication-capable registry would need to decompress the layer, compute the hashes of all files, and update the in-memory and on-disk hash index. On a layer pull, the layer needs to be reassembled from its segments triggering multiple per-file I/Os. Both operations require an increase in registry infrastructure cost and push/pull times.

Various embodiments of the present invention reorganize and optimize the layers in order to reduce redundancy, storage costs, and network costs. Many layers differ from other layers by a relatively small number of files. At least some embodiments disclosed herein include splitting "almost equal" layers into shared and unique contents to create new layers which are easily reused. By leveraging the overlap in these almost identical layers, the various embodiments of the present invention provide storage savings by at least a factor of 2, increase the reusability across images, and reduce network traffic.

Figure 3:
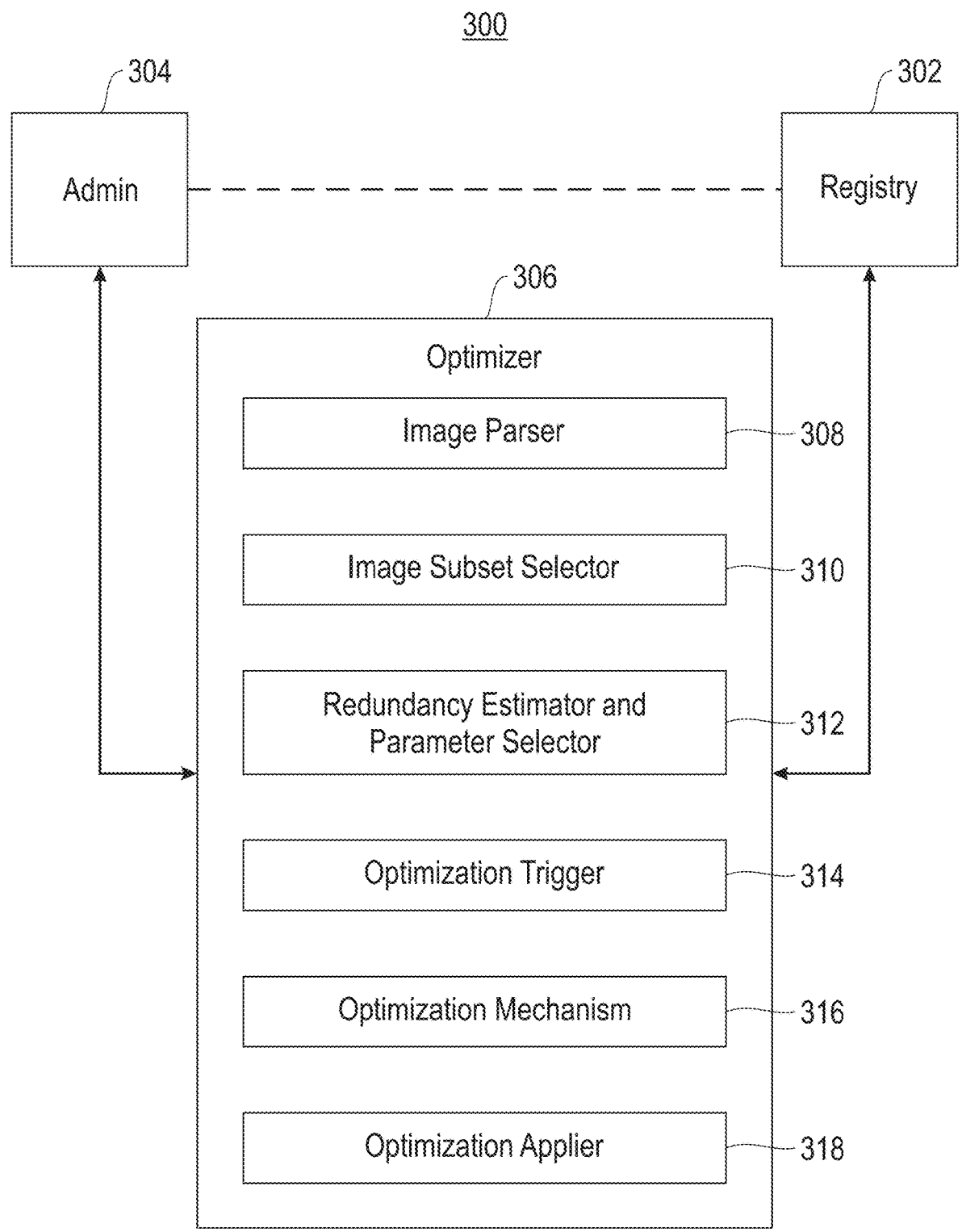
FIG. 3 is a high level architecture, in accordance with one embodiment of the present invention.
Figure 4:
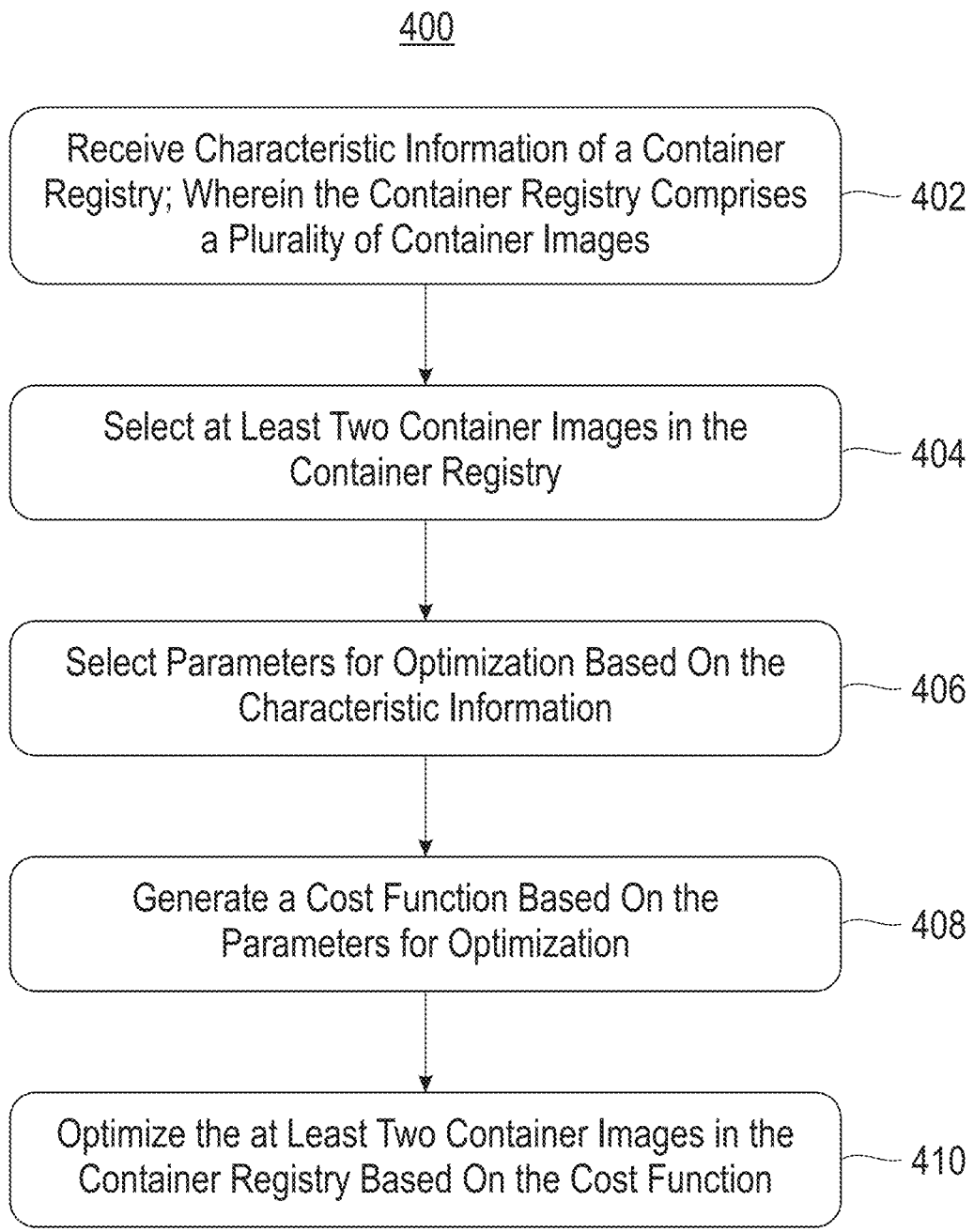
FIG. 4 is a flowchart of a method, in accordance with one embodiment of the present invention.
Figure 5:
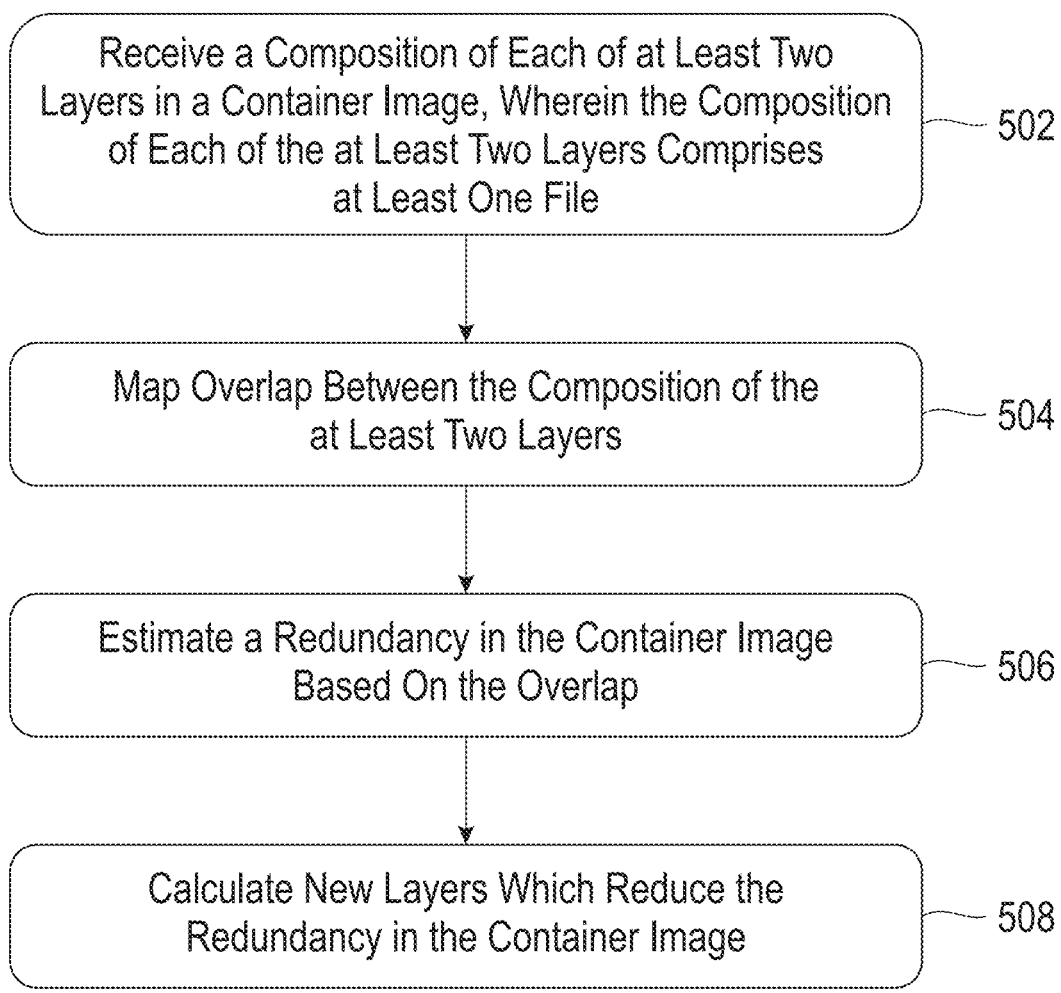
FIG. 5 is a flowchart of a method, in accordance with one embodiment of the present invention.

FIG. 3 is a high-level architecture for performing various operations of FIGS. 4 and 5, in accordance with various embodiments. The architecture 300 may be implemented in accordance with the present invention in any of the environments depicted in FIGS. 1-2 and 4-7, among others, in various embodiments. Of course, more or less elements than those specifically described in FIG. 3 may be included in architecture 300, as would be understood by one of skill in the art upon reading the present descriptions.

Each of the steps of the method 400 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 400 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 comprises a registry 302. The registry 302 may be a third-party registry for container images. Container images may be pushed and/or pulled from the registry 302. The registry 302 may be a public container registry, a private container registry, or any container registry known in the art.

Architecture 300 comprises an administrator 304. The administrator 304 manages the registry in any manner known in the art.

Architecture 300 comprises an optimizer 306 for running optimization operations against the registry data and any associated metadata. In a preferred approach, the optimizer 306 receives requests from the administrator 304 for registry optimization and/or analysis. The optimizer 306 may perform any of the various operations as described below in reference to method 400 and method 500. In one embodiment, the optimizer 306 generates output for the administrator 304 requests.

The optimizer 306 comprises components for performing various operations to be described in detail below in reference to method 400 and method 500. The optimizer 306 comprises an image parser 308. In one embodiment, an image parser 308 may parse container images in a container registry by generating a matrix from the set of container images. The image parser 308 may generate a binary matrix including container images and files as the dimensions of the matrix. In a preferred embodiment, the image parser 308 generates of mapping of which container images comprise which files. In one embodiment, the image parser 308 generates of mapping of the overlap between the container images, the layers in the container images, the files in the container images, etc.

In a preferred embodiment, the image parser 308 generates a matrix, $M_{ik}$, from a set of container images. For example, $M_{ik}$ equals 1, if and only if, image 1 requires file k. The image parser 308 may run parallel and creates sorted vectors of hashes, $f_i$, for each image using H(name+content). The individual vectors may be merge-sorted to form a single vector F which comprises all sorted file hashes. In one approach, the merge-sorting may be a single-threaded task. The $f_i$ vectors may be expanded and transformed based on F into binary vectors $b_i$. Binary vectors $b_i$ are combined to generate the matrix, $M_{ik}$.

The optimizer 306 comprises an image subset selector 310 for determining which part of the registry 302 to optimize. The image subset selector 310 may limit the number of images to optimize at a time. In various embodiments, optimizing the entire registry 302 may not be efficient. In a preferred embodiment, the image subset selector 310 accounts for client-side local optimization parameters. The image subset selector 310 selects subsets of images to restructure based on one or more factors. One factor includes the frequency of image pulls (e.g., in one approach, the image subset selector 310 selects the top 5% of images). Optimizing images which are pulled relatively infrequently may be an inefficient use of resources. A threshold frequency for selecting images to optimize may be set by a user, a manufacturer, a content provider, a services provider, etc. A threshold frequency may be determined in any manner known in the art. In one approach, the threshold frequency may be found in a look-up table.

Another factor includes image clustering. Images which are relatively frequently pulled together by clients may be clustered and optimized to improve savings for different clients in one embodiment of the present disclosure. Relative frequency may be set and/or determined in any manner described above.

Images which are labeled "official," preselected images, prelabeled "good quality" (e.g., or any equivalent) images, etc., may be considered to be of relatively higher quality compared to other images in the container registry. Images which are labeled "official," preselected images, prelabeled "good quality" (e.g., or any equivalent) images, etc., may not be optimized where the images are pre-optimized manually in a local level. The image subset selector 310 may select subsets of images to restructure based on any combination of factors.

The optimizer 306 comprises a redundancy estimator and parameter selector 312. The redundancy estimator and parameter selector 312 may estimate the amount of redundancy in the registry 302 by inspecting the output generated by the image parser 308. The redundancy estimator and parameter selector 312 computes savings for the registry 302 by counting the file reoccurrences in the output generated by the image parser 308 in one embodiment. In various embodiments described herein, redundancy refers to the redundancy of files within layers and/or within container registries. For example, a registry may be considered to have high redundancy if several images comprise the same files and the files are stored multiple times within the container registry.

In a preferred embodiment, the redundancy estimator and parameter selector 312 may determine parameters for the optimization mechanism 316 to be described in detail below. Parameters to be optimized may include storage costs, network costs, operations costs, the number of image-to-layer edges, the number of files, the number of layer-to-file edges, the number of image-layer-file paths, the number of layers in an image, etc.

In one embodiment, the redundancy estimator and parameter selector 312 assigns a variable for each parameter to be discussed in detail below. For example, $\alpha$ may represent the number of layers per image, $\beta$ may represent the storage redundancy, and $\gamma$ may represent the network and/or client storage redundancy, etc. In a preferred approach, the redundancy estimator and parameter selector 312 tracks and/or stores historical data of each parameter in any manner known in the art. In one approach, historical data of each parameter is stored in a table. The redundancy estimator and parameter selector 312 may update the savings computation periodically, continuously, manually, in response to a change in one or more parameters, etc.

The optimizer 306 comprises an optimization trigger 314. The optimization trigger 314 triggers the optimization mechanism 316, the optimization applier 318, any of the operations of method 400 and/or method 500 to be described in detail below, etc. The optimization trigger 314 triggers optimization on demand, in response to storage usage increasing above a predefined threshold, in response to duplicate files increasing above a predefined threshold, in response to a number of layers per image increasing above a predefined threshold, etc. Any predefined threshold may be defined by a user, the administrator 304, the registry 302, a service provider, a content provider, etc. Any predetermined value disclosed herein may be found in a look-up table. A demand may be received from a user, the administrator 304, the registry 302, a service provider, a content provider, etc.

In one approach, the optimization trigger 314 may determine a threshold is exceeded by scanning the registry files. In a preferred approach, scanning may be performed incrementally to update statistics for parameters and/or estimate redundancy.

The optimizer 306 comprises an optimization mechanism 316. In a preferred embodiment, the optimization mechanism 316 uses the output generated by the image parser 308 including the matrix of images and files. The optimization mechanism 316 may use any output generated by the redundancy estimator and parameter selector 312 including the set of images to be optimized and/or any parameters (e.g., with any associated variables) selected for optimizing. In a preferred embodiment, the optimization mechanism 316 is triggered by the optimization trigger 314.

In a preferred embodiment, the optimization mechanism 316 comprises at least some of the following embodiments described below.

The set of images may be denoted by I, the set of layers may be denoted by J, the set of files may be denoted by K. E is the set of pairs (i,k)(i∈I∈K) for which image i includes file k. In various approaches, E is the input. Denote the size of file k by $g_k$ and the frequency of image i (e.g., usage) by $f_i$. In a preferred approach, the optimization mechanism 316 outputs a structure comprising the Boolean decision symbols $x_{j,i}$, $y_{k,j}$, and $z_{i,j,k}$ where $x_{j,i}=1$ if and only if layer j is contained (e.g., as a pointer) image i, $y_{k,j}=1$ if and only if file k is contained (e.g., as a copy) in layer j, and $z_{i,j,k}=1$ if and only if layer j is included in image i and file k is included in layer j.

A cost function may be defined to minimize a weighted combination of costs associated with the parameters defined above. The cost function may be based on one or more factors including an operation cost, a storage cost, and/or a network cost. In a preferred embodiment, the cost function comprises at least the storage, network, and operation costs defined by:

COST=α*operation+β*storage+γ*network.

The operation cost counts the number of image-to-layers edges weighted by image frequency, $f_i$. The operation cost may be defined by:

operation=$\Sigma_i f_i \Sigma_j x_{j,i}$.

The storage cost counts the number of files and/or the layer-to-file edges weighted by the file size, $g_k$. The storage cost may be defined by:

storage=$\Sigma_k g_k \Sigma_j y_{k,j}$.

The network cost counts the number of image-layer-file paths weighted by the image frequency, $g_k$. The network cost may be defined by:

network=$\Sigma_i f_i \Sigma_j \Sigma_k g_k z_{i,j,k}$.

The optimization mechanism 316 minimizes the cost function subject to various constraints.

In one embodiment, the cost function is generated to meet the file requirements of the images. The cost function may be generated such that $\Sigma_{j\in J} z_{i,j,k} \geq 1$ where ((i,k)∈E).

In one embodiment, the cost function is generated such that an image does not contain any layer that the image does not utilize. The cost function may be generated such that $\Sigma x_{j,i} \leq \Sigma_{k:(i,k)\in E} z_{i,j,k}$ (□i∈I)(□j∈J). Specifically, for every i and j, if □$z_{i,j,k}=0$ for all k such that (i,k)∈E, then □$x_{j,i}=0$.

In one embodiment, the cost function is generated such that an image does not contain any file that the image does not utilize. The cost function may be generated such that $y_{k,j}+x_{j,i} \leq 1$ where (i∈I, k∈K) ((i,k)∉E).

In another embodiment, the cost function is limited such that the order of files as the files appear over the layer stack in the resulting image is constrained by the original order of the files.

In an alternative embodiment, the optimization mechanism 316 uses a greedy algorithm based on the cost function described above. In one approach, the greedy algorithm initiates with an empty set of layers and constructs layers based on the requirements in E. In a preferred approach, the algorithm does not use the layers in the existing registry structure. The algorithm considers all files in a random order and for each file considers all images requiring the file.

In one approach, for each image, the algorithm either creates a new file or maintains the original file. The algorithm considers the cost of each possible action according to the state of the solution up to that point. In one approach, there are five possible cases including: case 1: adding an image-layer connection, case 2: adding a layer-file connection, case 3: doing nothing, case 4: adding image-layer and layer-file connections, and case 5: adding new layer and image-layer and layer-file connections.

For case 1, the algorithm considers using an existing layer l, created in the previous step, comprising the current file but not yet referenced by the image. Case 1 may add a new edge from the image to l. In case 1, the operation cost increases by 1 in response to adding an image-to-layer edge, the storage cost remains unchanged, and the network cost depends on the files already contained in l. If image i is connected to layer l, image i serves additional files. If the additional files are used by image i, the additional files are discounted. Otherwise, too many files are created unnecessarily.

In a preferred embodiment, the algorithm takes the action with the lowest cost.

In one approach, the algorithm may be extended to skip edges that create incorrect reorderings.

In a preferred embodiment, the optimization mechanism 316 outputs a new structure to be implemented by the optimization applier 318 described in detail below.

The optimizer 306 comprises an optimization applier 318. The optimization applier 318 receives the new structure generated by the optimization mechanism 316 and creates new layers. The optimization applier 318 may generate a manifest for each image.

In some embodiments, images may be pushed before the optimization structure is fully applied by the optimization applier 318. In one approach, a copy of layers referred to by the images may be maintained such that corresponding pushed images are unaffected by the optimization. In another approach, an image may be updated locally with the updated structure on client request. The request may be explicit or due to a push against an existing image. An image that is pulled prior to optimization and pushed with an additional layer post-optimization uses the new (read-only) layers to avoid the registry slowly storing the previous layers. In the case where an image is pulled prior to optimization and pushed with an additional layer post-optimization, the client may pull the updated layers for the image (e.g., excluding the new layer) and then append the new layer. The pulling and appending in this case may occur automatically at push in some embodiments.

Now referring to FIG. 4, a flowchart of a method 400 is shown according to one embodiment. The method 400 may be performed in accordance with the present invention in any of the environments depicted in FIGS. 1-3 and 5-7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes receiving characteristic information of a container registry. The container registry preferably comprises a plurality of container images. In a preferred embodiment, the characteristic information comprises the plurality of container images in the container registry and layers and files in each of the container images in the container registry. Each container image may comprise layers and each layer may comprise files as would be understood by one having ordinary skill in the art.

The characteristic information may be gathered in any manner known in the art. In one approach, the container images may be parsed to determine the characteristic information of each container image. In one embodiment, an image parser may parse container images in a container registry by generating a matrix from the set of container images. The image parser may generate a binary matrix including container images and files as the dimensions of the matrix. In a preferred embodiment, the image parser generates of mapping of which container images comprise which files. In one embodiment, the image parser generates of mapping of the overlap between the container images, the layers in the container images, the files in the container images, etc. In one example, Layer 1 contains File X, File 1, File 2, . . . up to File 99. Layer 2 contains File 1, File 2, . . . up to File 99, and File Y. The mapping may show that Layer 1 and Layer 2 are in the same container image and Files 1-99 overlap between Layer 1 and Layer 2.

In one preferred embodiment, the image parser generates a matrix, $M_{ik}$, from a set of container images. For example, $M_{ik}$ equals 1, if and only if, image i requires file k. The image parser may run parallel and creates sorted vectors of hashes, $f_i$, for each image using H(name+ content). The individual vectors may be merge-sorted to form a single vector F which comprises all sorted file hashes. In one approach, the merge-sorting may be a single-threaded task. The $f_i$ vectors may be expanded and transformed based on F into binary vectors $b_i$. Binary vectors $b_i$ are combined to generate the matrix, $M_{ik}$.

In another embodiment, characteristic information may refer to a client side configuration, resource requirements, historical resource requirements, usage requirements, etc. In a preferred approach, client-side local optimization parameters may be considered for various embodiments disclosed herein. Client side characteristic information may be gathered and/or stored in any manner known in the art.

Operation 404 selecting at least two container images in a container registry. Container images may be pushed and/or pulled from the container registry. The container registry may be a third-party registry for container images. The container registry may be a public container registry, a private container registry, or any container registry known in the art.

In various embodiments, the selected at least two container images may be container images which are accessed relatively frequently compared to other container images in the container registry. Optimizing the entire registry (e.g., every container image in the container registry) may not be efficient. Container images which are accessed relatively frequently may include the top 5% of pulled images in terms of frequency in one example. Optimizing container images which are pulled relatively infrequently may be an inefficient use of resources.

In another example, container images may be selected based on image clustering. Images which are relatively frequently pulled together by clients may be clustered and optimized to improve savings for different clients in one embodiment of the present disclosure.

In yet another embodiment, selecting the at least two container images includes not selecting container images which are of relatively higher quality compared to other container images in the container registry. Images which are labeled "official," preselected images, prelabeled "good quality" (e.g., or any equivalent) images, etc., may be considered to be of relatively higher quality compared to other images in the container registry. Images which are labeled "official," preselected images, prelabeled "good quality" (e.g., or any equivalent) images, etc., may not be optimized where the images are pre-optimized manually in a local level.

In some approaches, the at least two container images may be selected in response to a request from an administrator, a user, the container registry, a service provider, a content provider, etc. For example, an administrator may specifically request a set of container images be optimized for a project.

Operation 406 includes selecting parameters for optimization based on the characteristic information. In various embodiments disclosed herein, optimization refers to reducing redundancy of files in the container image, a set of container images, and/or the container registry. A container image may comprise a plurality of layers. Each layer may have a plurality of files. The files may be repeated in multiple layers of the container image and/or in multiple container images in a container registry. Duplicated files across a container image, a set of container images, and/or a container registry creates redundancy as would be understood by one having ordinary skill in the art upon reading the present disclosure. For example, a registry may be considered to have high redundancy if several images comprise the same files and the files are stored multiple times within the container registry.

Parameters for optimization based on the characteristic information may include the number of file reoccurrences, storage costs, network costs, operations costs, the number of image-to-layer edges, the number of files, the number of layer-to-file edges, the number of image-layer-file paths, the number of layers in an image, etc.

In one embodiment, the method 400 assigns a variable for each parameter to be discussed in detail below. For example, $\alpha$ may represent the number of layers per image, $\beta$ may represent the storage redundancy, and $\gamma$ may represent the network and/or client storage redundancy, etc. In a preferred approach, the method 400 tracks and/or stores historical data of each parameter in any manner known in the art. In one approach, historical data of each parameter is stored in a table. The method 400 may update the savings computation periodically, continuously, manually, in response to a change in one or more parameters, etc.

In various approaches, a parameter for optimization may include a trigger for optimization. An optimization trigger may be on demand, in response to storage usage increasing above a predefined threshold, in response to duplicate files increasing above a predefined threshold, in response to a number of layers per image increasing above a predefined threshold, etc. Any predefined threshold may be defined by a user, the administrator, the container registry, a service provider, a content provider, etc. Any predetermined value disclosed herein may be found in a look-up table. A demand may be received from a user, the administrator, the container registry, a service provider, a content provider, etc.

Operation 408 includes generating a cost function based on the parameters for optimization. In a preferred embodiment, the cost function uses the output generated by the image parser including the matrix of container images and files. The cost function may be generated using any output including the set of container images to be optimized and/or any parameters (e.g., with any associated variables) selected for optimizing.

In a preferred embodiment, the cost function comprises at least some of the following embodiments described below.

The set of images may be denoted by I, the set of layers may be denoted by J, the set of files may be denoted by K. E is the set of pairs (i,k)(i∈I∈K) for which image i includes file k. Denote the size of file k by $g_k$ and the frequency of image i (e.g., usage) by $f_i$. In a preferred approach, the cost function outputs a structure comprising the Boolean decision symbols $x_{j,i}$, $y_{k,j}$, and $z_{i,j,k}$ where $x_{j,i}=1$ if and only if layer j is contained (e.g., as a pointer) image i, $y_{k,j}=1$ if and only if file k is contained (e.g., as a copy) in layer j, and $z_{i,j,k}=1$ if and only if layer j is included in image i and file k is included in layer j.

A cost function may be defined to minimize a weighted combination of costs associated with the parameters defined above. In a preferred embodiment, the cost function comprises at least the storage, network, and operation costs defined by:

$$COST=\alpha*operation+\beta*storage+\gamma*network.$$

The operation cost counts the number of image-to-layers edges weighted by image frequency, $f_i$. The operation cost may be defined by:

$$operation=\Sigma_i f_i \Sigma_j x_{j,i}.$$

The storage cost counts the number of files and/or the layer-to-file edges weighted by the file size, $g_k$. The storage cost may be defined by:

$$storage=\Sigma_k g_k \Sigma_j y_{k,j}.$$

The network cost counts the number of image-layer-file paths weighted by the image frequency, $g_k$. The storage cost may be defined by:

$$network=\Sigma_i f_i \Sigma_j \Sigma_k g_k z_{i,j,k}.$$

In one embodiment, the cost function is generated to meet the file requirements of the images. The cost function may be generated such that $\Sigma_{j\in J} z_{i,j,k} \geq 1$ where $((i,k)\in E)$.

In one embodiment, the cost function is generated such that an image does not contain any layer that the image does not utilize. The cost function may be generated such that $\Sigma x_{j,i} \leq \Sigma_{k:(i,k)\in E} z_{i,j,k}$ ($\square i\in I$)($\square f\in J$). Specifically, for every i and j, if $\square z_{i,j,k}=0$ for all k such that (i,k)∈E, then $\square x_{j,i}=0$.

In one embodiment, the cost function is generated such that an image does not contain any file that the image does not utilize. The cost function may be generated such that $y_{k,j}+x_{j,i} \leq 1$ where (i∈I, k∈K) ((i,k)∉E).

In another embodiment, the cost function is limited such that the order of files as the files appear over the layer stack in the resulting image is constrained by the original order of the files.

In a preferred embodiment, the cost function is based on any combination of the factors described above. The cost function may be based on factors selected from an operation cost, a storage cost and a network cost according to one embodiment.

In an alternative embodiment, the optimization is performed using a greedy algorithm based on the cost function described above. In one approach, the greedy algorithm initiates with an empty set of layers and constructs layers based on the requirements in E. In a preferred approach, the algorithm does not use the layers in the existing registry structure. The algorithm considers all files in a random order and for each file considers all images requiring the file.

In one approach, for each image, the algorithm either creates a new file or maintains the original file. The algorithm considers the cost of each possible action according to the state of the solution up to that point. In one approach, there are five possible cases including: case 1: adding an image-layer connection, case 2: adding a layer-file connection, case 3: doing nothing, case 4: adding image-layer and layer-file connections, and case 5: adding new layer and image-layer and layer-file connections.

For case 1, the algorithm considers using an existing layer l, created in the previous step, comprising the current file but not yet referenced by the image. Case 1 may add a new edge from the image to l. In case 1, the operation cost increases by 1 in response to adding an image-to-layer edge, the storage cost remains unchanged, and the network cost depends on the files already contained in l. If image i is connected to layer l, image i serves additional files. If the additional files are used by image i, the additional files are discounted. Otherwise, too many files are created unnecessarily.

In a preferred embodiment, the algorithm takes the action with the lowest cost.

In one approach, the algorithm may be extended to skip edges that create incorrect reorderings.

In a preferred embodiment, the cost function outputs a new structure to optimize the at least two container images in the container registry based on the cost function.

Operation 410 includes optimizing the at least two container images in the container registry based on the cost function. In a preferred approach, optimizing the at least two container images in the container registry based on the cost function reduces the redundancy of files in each of the container images, in the set of container images, and/or in the container registry.

In a preferred embodiment, optimizing the container images in the container registry comprises calculating new layers which reduce the redundancy in the container images.

In one example of method 400, a matrix of image-to-file requirements for the container registry may be generated using characteristic information of the container registry in operation 402. Operation 404 may select a subset of images in the matrix based on a request from an administrator and/or based on administrator preferences. The parameters $\alpha, \beta$, and $\gamma$ are selected and the subset of images are optimized. The optimization may replace the original layers and restructure the registry such that the redundancy of files is reduced. In response to the optimization, the input/output of the optimization may be stored for future optimizations. The input/output of the optimization may be stored in any manner known in the art. In a preferred approach, the input/output of the optimization may be stored in a table.

In another example of method 400, an administrator may generate a set C of configuration values, $C=\{\{max_1, \alpha_1, \beta_1\}, \ldots (max_n, \alpha_n, \beta_n)\}$, e.g., $C=\{(10, 1, 0.1), (1000, 1, 0.1)\}$. The registry may be restricted according to the example described above. For each configuration, the method 400 generates a spectrum of capacity savings (e.g., $C_1=10\%$, $C_2=50\%$, etc.) and an estimated cost (e.g., in terms of resource usage) of applying the new structure on the registry (I/O) (e.g., $C_1=50$ TB, $C_2=60$ TB, etc.). In response to the optimization, the input/output of the optimization may be stored for future optimizations. The input/output of the optimization may be stored in any manner known in the art. In a preferred approach, the input/output of the optimization may be stored in a table.

In yet another example of method 400, in a first case, the registry may be restructured as set out in the first example described above. A future configuration may be recommended based on the system resources, types of images in the container images, historical data, etc. Storage constrained systems benefit from greater storage capacity reduction (e.g., increased max value). In a second case, the registry may be restructured according to the second example described above. The configuration values may be reduced for each time the registry is restructured. The configuration values may be selected based on the prior restructuring for the same or substantially similar systems and/or systems with substantially similar resources. In both cases, the input/output of the optimization may be stored for future optimizations. The input/output of the optimization may be stored in any manner known in the art. In a preferred approach, the input/output of the optimization may be stored in a table.

In some embodiments, some container images may be pushed before the container images are optimized. In one approach, a copy of layers referred to by the container images may be maintained such that corresponding pushed container images are unaffected by the optimization. In another approach, an image may be updated locally with the updated structure on client request. The request may be explicit or due to a push against an existing image. An image that is pulled prior to optimization and pushed with an additional layer post-optimization uses the new (read-only) layers to avoid the registry slowly storing the previous layers. In the case where an image is pulled prior to optimization and pushed with an additional layer post-optimization, the client may pull the updated layers for the image (e.g., excluding the new layer) and then append the new layer. The pulling and appending in this case may occur automatically at push in some embodiments.

Now referring to FIG. 5, a flowchart of a method 500 is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502. Operation 502 includes receiving a composition of each of at least two layers in a container image. In a preferred embodiment, the composition of each of the at least two layers comprises at least one file.

The composition of each of the at least two layers in the container image may be determined in any manner known in the art. In one approach, the container image may be parsed to determine the composition of the container image. In one embodiment, an image parser may parse container images into layers and files.

Operation 504 includes mapping overlap between the composition of the at least two layers. The image parser may generate a mapping of which layers comprise which files. In one embodiment, the image parser generates of mapping of the overlap between the layers in the container image and/or files in the layers. In one example, Layer 1 contains File X, File 1, File 2, ... up to File 99. Layer 2 contains File 1, File 2, ... up to File 99, and File Y. The mapping may show that Layer 1 and Layer 2 are in the same container image and Files 1-99 overlap between Layer 1 and Layer 2. Overlap may refer to any redundancy in data, files, layers, images, registry, etc., as would be understood by one having ordinary skill in the art upon reading the present disclosure.

Operation 506 includes estimating a redundancy in the container image based on the overlap. In various embodiments described herein, redundancy refers to the redundancy of files within layers and/or within container images. For example, a container image may be considered to have high redundancy if several layers within the image comprise the same files and the files are stored multiple times within the container image. In a preferred embodiment, the redundancy may be estimated based on the overlap in composition of each of the at least two layers in a container image. In one embodiment, the redundancy may be estimated based on the number of file reoccurrences. The redundancy may be estimated in any manner known in the art.

Operation 508 includes calculating new layers which reduce the redundancy in the container image. In a preferred embodiment, calculating new layers which reduce the redundancy comprises generating a cost function according to the embodiments described above. In some approaches, the calculated new layers replace the original at least two layers in a container image.

In one embodiment, new layers are calculated for container images which are accessed relatively frequently compared to other container images in a container registry having the container image as described in detail above.

In another embodiment, new layers are not calculated for container images which are of relatively higher quality as described in detail above.

Figure 6:
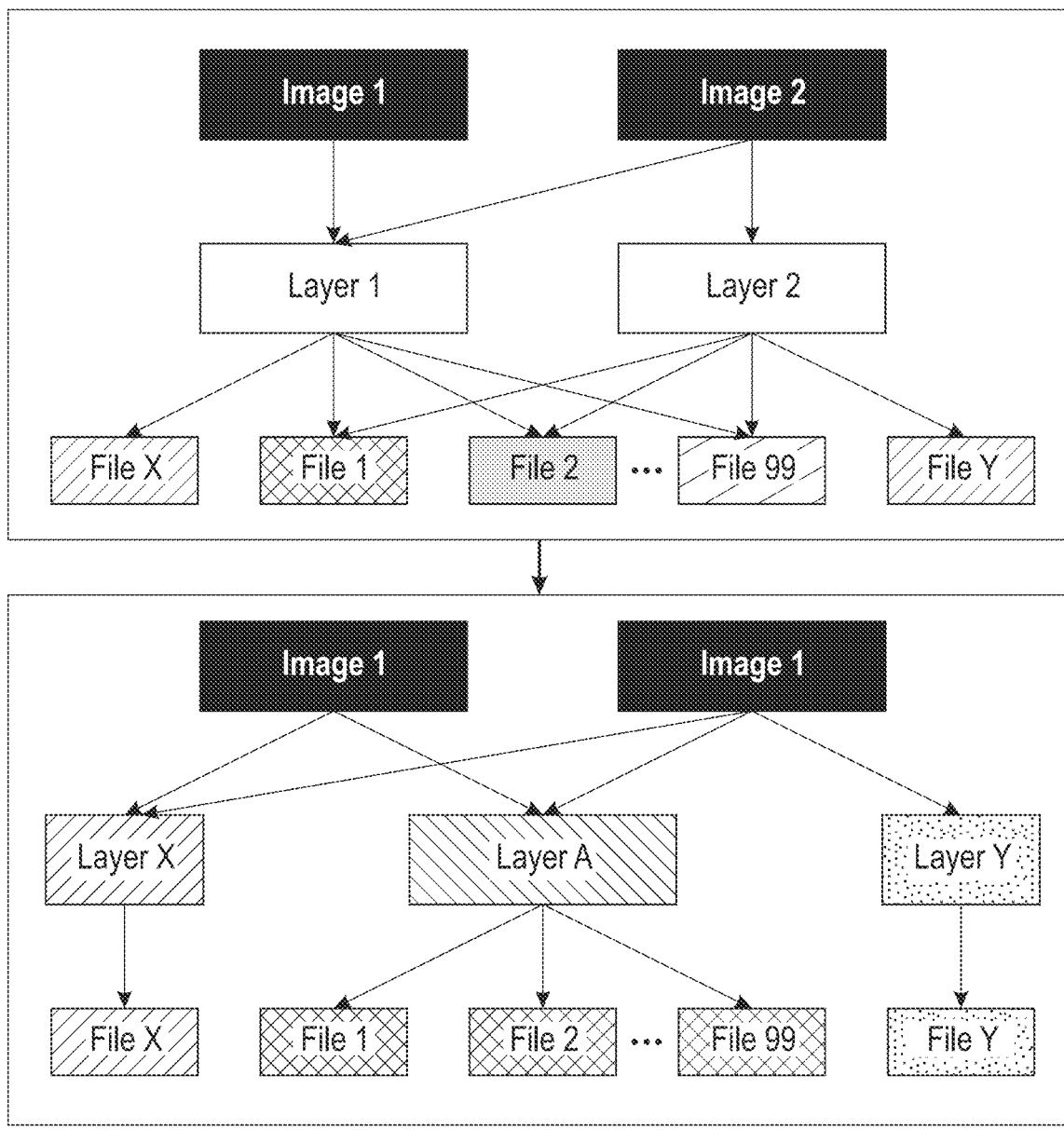
FIG. 6 is a depiction of an exemplary optimization, in accordance with one embodiment of the present invention.

FIG. 6 is depiction of an exemplary optimization, in accordance with various embodiments. The optimization 600 may be implemented in accordance with the present invention in any of the environments depicted in FIGS. 1-5 and 7, among others, in various embodiments. Of course, more or less elements than those specifically described in FIG. 6 may be included in optimization 600, as would be understood by one of skill in the art upon reading the present descriptions.

In a preferred embodiment, the optimization 600 may be performed according to method 400 described in detail above. As shown, the container registry comprising Image 1 and Image 2 has high redundancy where Files 1-99 are stored in both Image 1 and Image 2. Image 2 has a high redundancy because Image 2 comprises Layer 1 and Layer 2 and Files 1-99 are stored in both Layer 1 and Layer 2. According to various embodiments described above, Layer X, Layer A, and Layer Y are the calculated new layers which replace Layer 1 and Layer 2. The container registry and the container images are optimized where no file is stored more than once within the container registry and the container images.

Figure 7:
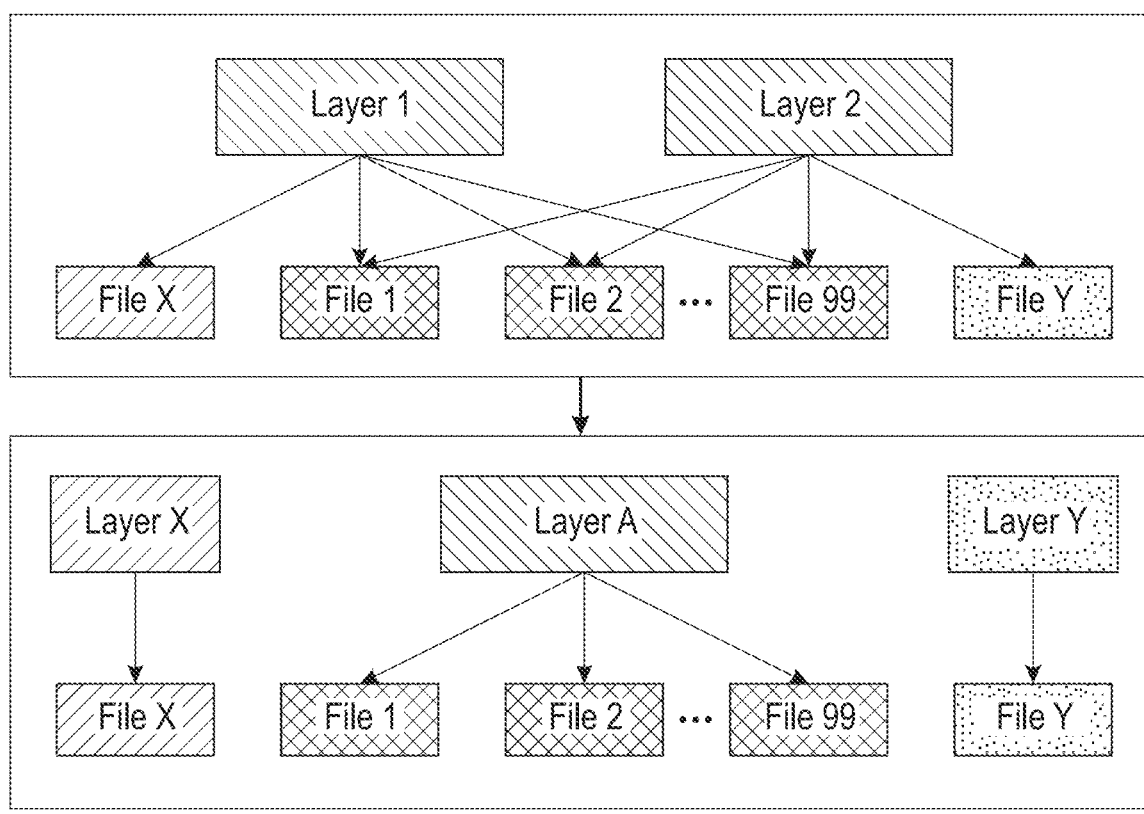
FIG. 7 is a depiction of an exemplary optimization, in accordance with one embodiment of the present invention.

FIG. 7 is a depiction of an exemplary optimization, in accordance with various embodiments. The optimization 700 may be implemented in accordance with the present invention in any of the environments depicted in FIGS. 1-6, among others, in various embodiments. Of course, more or less elements than those specifically described in FIG. 7 may be included in optimization 700, as would be understood by one of skill in the art upon reading the present descriptions.

In a preferred embodiment, the optimization 700 may be performed according to method 500 described in detail above. The container image has high redundancy where Files 1-99 are stored in both Image 1 and Image 2. According to various embodiments described above, Layer X, Layer A, and Layer Y are the calculated new layers which replace Layer 1 and Layer 2. The container image is optimized where no file is stored more than once within the container image.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving characteristic information of a container registry, wherein the container registry comprises a plurality of container images, wherein the characteristic information comprises layers and files for each container images in the plurality of container images, wherein an image parser generates a mapping of overlapping files in the layers in the container images, the layers in the container images, and the files in the container images;
selecting at least two container images in the container registry, wherein the selection is based at least in part on image clustering including container images which are pulled together by a client relatively more frequently compared to other container images in the container registry;
selecting parameters for optimization based on the characteristic information, wherein at least one of the parameters for optimization is a trigger for optimization;
generating a cost function based on the parameters for optimization, each of the parameters for optimization is a variable of the cost function, wherein the cost function is based at least in part on the mapping generated by the image parser, wherein the cost function is generated such that at least one of the selected container images does not contain any layer that the at least one of the selected container images does not utilize; and
optimizing the selected container images in the container registry based on an operation cost, a storage cost, and a network cost that are variables of the cost function.

2. The computer-implemented method of claim 1, wherein selecting the at least two container images includes selecting container images which are accessed relatively more frequently compared to other container images in the container registry, wherein the selected container images are in a top 5% of pulled images in terms of relative frequency.

3. The computer-implemented method of claim 1, wherein selecting the at least two container images includes not selecting container images which are of relatively higher quality compared to other container images in the container registry.

4. The computer-implemented method of claim 1, wherein the characteristic information is selected from the group consisting of: a client side configuration, resource requirements, historical resource requirements, and usage requirements, wherein selecting the at least two container images is based on an administrator request.

5. The computer-implemented method of claim 1, wherein the cost function is a weighted combination of the variables of the cost function, wherein the operation cost is weighted by image frequency, wherein the storage cost is weighted by file size, wherein the network cost is weighted by the image frequency.

6. The computer-implemented method of claim 1, wherein the trigger for optimization is selected from the group consisting of: on demand, a first predefined threshold for storage usage, a second predefined threshold for duplicate files, and a third threshold for a number of layers per container image; and wherein optimizing the container images in the container registry comprises:
calculating new layers which reduce redundancy in the container images.

7. The computer-implemented method of claim 6, wherein the redundancy in the container images refers to redundancy of files in the container images.

8. A computer-implemented method, comprising:
receiving a composition of each of at least two layers in a first container image, wherein the composition of each of the at least two layers comprises at least one file;
mapping overlapping files in layers in the first container image and a second container image;
estimating a redundancy in the first container image based on the overlap;
selecting parameters of the two container images for optimization;
generating a cost function based on the parameters for optimization, wherein each of the parameters for optimization is a variable of the cost function, wherein the cost function is based at least in part on the mapping;
optimizing the first container image based on an operation cost, a storage cost, and a network cost that are variables of the cost function, wherein the optimizing comprises calculating new layers which reduce the redundancy in the first container image wherein the cost function is generated such that the first container image does not contain any layer that the first container image does not utilize.

9. The computer-implemented method of claim 8, wherein new layers are calculated for container image which are accessed relatively more frequently compared to other container images in a container registry having the first container image, wherein the first container image and the second container image are in top 5% of pulled images in terms of relative frequency.

10. The computer-implemented method of claim 8, wherein the first container image and the second container image do not have relatively higher quality compared to other container images in a container registry having the first container image and the second container image.

11. The computer-implemented method of claim 8, wherein the calculated new layers replace the original at least two layers in the container image.

12. The computer-implemented method of claim 8, wherein the operation cost is weighted by image frequency, wherein the storage cost is weighted by file size, wherein the network cost is weighted by the image frequency.

13. A computer program product for reducing redundancy, the computer program product comprising a computer readable storage medium having program instructions embodied therewith, the program instructions executable by a computer to cause the computer to:
receive, by the computer, characteristic information of a container registry, wherein the container registry comprises a plurality of container images, wherein the characteristic information comprises layers and files for each container image in the plurality of container images, wherein an image parser generates a mapping of overlapping files in the layers in the container images, the layers in the container images, and the files in the container images;
select, by the computer, at least two container images in the container registry, wherein the selection is based at least in part on image clustering including container images which are pulled together by a client relatively more frequently compared to other container images in the container registry;
select, by the computer, parameters for optimization based on the characteristic information, wherein at least one of the parameters for optimization is a trigger for optimization;
generate, by the computer, a cost function based on the parameters for optimization, wherein each of the parameters for optimization is a variable of the cost function, wherein the cost function is based at least in part on the mapping generated by the image parser, wherein the cost function is generated such that at least one of the selected container images does not contain any layer that the at least one of the selected container images does not utilize; and
optimize, by the computer, the selected container images in the container registry based on an operation cost, a storage cost, and a network cost that are variables of the cost function.

14. The computer program product of claim 13, wherein selecting the at least two container images includes selecting container images which are accessed relatively more frequently compared to other container images in the container registry, wherein the selected container images are in a top 5% of pulled images in terms of relative frequency.

15. The computer program product of claim 13, wherein selecting the at least two container images includes not selecting container images which are of relatively higher quality compared to other container images in the container registry.

16. The computer program product of claim 13, wherein the characteristic information is selected from the group consisting of: a client side configuration, resource requirements, historical resource requirements, and usage requirements, wherein selecting the at least two container images is based on an administrator request.

17. The computer program product of claim 16, wherein the cost function is a weighted combination of the variables, wherein the operation cost is weighted by image frequency, wherein the storage cost is weighted by file size, wherein the network cost is weighted by the image frequency.

18. The computer program product of claim 13, wherein optimizing the container images in the container registry comprises program instructions to cause the computer to:
calculate, by the computer, new layers which reduce redundancy in the container images.

19. The computer program product of claim 18, wherein the redundancy in the container images refers to redundancy of files in the container images.

* * * * *